3,843,478
MATTE FINISH FILM

Edward J. Zuscik, Apeldoorn, Netherlands, assignor to Crown Zellerbach Corporation, San Francisco, Calif.
No Drawing. Filed Apr. 28, 1972, Ser. No. 248,616
Int. Cl. B32b 33/00
U.S. Cl. 161—164                                    11 Claims

ABSTRACT OF THE DISCLOSURE

A matte finish film simulating cloth comprising a composite laminate of an ethylene-propylene block copolymer and at least one other synthetic thermoplastic polymer layer. The ethylene-propylene block copolymer has an ethylene content of from about 3% to about 25% by weight of the copolymer and a nominal melt flow rate at 230° C. of from about 3 to about 5 grams/10 minutes. The film has a gloss of less than 10% and an overall thickness of from about 0.75 to 10.0 mils. The other synthetic thermoplastic polymer layer is preferably low density polyethylene and the film preferably has a stiffness of less than about 30,000 p.s.i. The other synthetic thermoplastic polymer layer may be pigmented and the film may contain more than two layers. The film has special utility as an outer covering for disposable diapers and for surgical drapes.

BACKGROUND OF THE INVENTION

Thermoplastic film having a matte finish have conventionally been produced by embossing. One such procedure comprises casting a film onto a matte surfaced chill roll and through a nip roll thereby imparting a matte surface to the film. However, this process suffers from the disadvantage that the molten film tends to stick to the nip roll, which is usually constructed of rubber. Also, rubber rolls must be changed periodically because abrasion, cuts and general wear imparts imperfection to the matte surface.

Blown film can only be matte finished by a second embossing operation since no chill roll is employed in the blown film process. Such a secondary embossing operation imparts additional costs to these products.

It is also very difficult to emboss thin films (i.e., films having a thickness of less than about 1 mil.) by conventional techniques due to their very flimsy nature and a tendency to stick to the nip roll in the embossing operation.

The gloss of films can also be lowered by adding pigments, but generally such pigmented films have a gloss much higher (e.g. 40–50%) than is desirable for a satisfactory matte surface.

SUMMARY OF THE PRESENT INVENTION

The present invention comprises a matte film which simulates cloth in appearance formed directly in the extrusion process itself without requiring an additional embossing step. This is accomplished by co-extruding a composite film, one of whose outer layers is an ethylene-propylene block copolymer having an ethylene content between about 3% and 25% by weight of the copolymer and preferably about 5% to 10% by weight, and a nominal melt flow rate at 230° C. of between about 3 and about 5 grams/10 minutes. The thickness of the ethylene-propylene block copolymer layer is between about 0.02 and about 0.2 mil and the total film thickness from about 0.75 to about 10.0 mils preferably from about 0.75 to about 2.0 mils. The other film layer is preferably a synthetic thermoplastic polymer which imparts a low stiffness to the product. Such low stiffness is desirable for imparting satisfactory drape qualities to the composite film. The composite film may contain two or more layers, and one or more of the layers may be pigmented for aesthetic purposes.

DESCRIPTION OF PREFERRED EMBODIMENTS

It has been found that a matte finished film can be produced during the extrusion of a thermoplastic film by employing co-extrusion techniques and employing as one of the outer layers of the composite film a certain type of ethylene-propylene block copolymer.

Co-extrusion techniques are well established in the art and need not be discussed in detail. Such techniques for cast film involve either the employment of an adapter for the die-head to combine the various thermoplastic resin streams or a special die-head having a multiplicity of cavities therein for receiving the various thermoplastic resin materials. Blown tubing composite film technology is also well established and one can employ either an adapter prior to the blown tubing die-head or use a specialized die-head to effect combination of various thermoplastic resin materials into a composite film. Any of these approaches are satisfactory for forming the film product of the present invention.

It has been found that a special type of ethylene-propylene block copolymer which is normally employed in injection molding for producing high impact strength heavy duty products can be co-extruded with other thermoplastic resin materials in a very thin outer layer to produce a composite film having a high matte surface, i.e., a gloss less than about 10%. The ethylene-propylene block copolymers employed in the present invention contain from about 3% to about 25% by weight and preferably about 5% to about 10% by weight ethylene component and have a nominal flow rate at 230° C. of between about 3 and 5 grams/10 minutes. In order to be useful for the present invention, the block copolymer must, when cast as a 1.0 mil (or less) film have a gloss less than about 10% and preferably less than about 5.0%.

A preferred ethylene-propylene block copolymer is one manufactured by Hercules Inc., Wilmington, Delaware under the trademark PRO–FAX 8523. This copolymer has a density at 23° C. of 0.904 grams/cc. (determined by ASTM Test D–792), a nominal melt flow rate of 4.0 grams/10 minutes at 230° C. (determined by ASTM Test D–1238), a tensile yield strength at 2.0 inches/minutes, of 3200 p.s.i. (determined in accordance with ASTM Test D–638), a tensile yield elongation at 2.0 inches/minutes at 7% (determined in accordance with ASTM Test D–638), an Izod impact at 23° of 2.5 ft.-lb./inch notch (determined in accordance with ASTM Test D–256), an Izod impact at —18° C. of 1.0 ft.-lb./inch notch, a deformation under load at 2,000 p.s.i., 24 hours, 50° C. of 23% and at 1,000 p.s.i. 24 hours, 50° C. of 3.5% (both determined in accordance with ASTM Test D–621), a stiffness in flexure of 100,000 p.s.i. (determined in accordance with ASTM Test D–747), a flexural modulus of 150,000 p.s.i. (determined in accordance with ASTM Test D–790), a Rockwell hardness on the R scale of 72 (determined in accordance with ASTM Test D–785), a deflection temperature at 66 p.s.i. of 91° C. (determined in accordance with ASTM Test D–648), a deflection temperature at 264 p.s.i. of 52° C., a water absorption (24 hour emersion)of 0.02% (determined in accordance with ASTM Test D–570), no environmental stress cracking in 100% Igepal (determined in accordance with ASTM Test D–1693) and a shrinkage from mold cavities of 0.011 inch/inch (1/16th inch section) and 0.013 inch/inch (⅛ inch section) (determined in accordance with ASTM Test D–955). The copolymer has DSC (differential scanning calorimeter) melt points of 120° C. and 162° C. A one mil cast film of this copolymer has a density of 0.893 gm./cc. a haze of 94%, a stiffness (secant modulus) of 80,000 p.s.i. and a gloss of 4.6%.

The ethylene-propylene block copolymers referred to herein may be made by conventional polymerization techniques well-known in the art which involves the periodic introduction of ethylene into the reaction medium during the polymerization of propylene.

It has been found that in order to obtain a gloss of less than 10% for the composite film of this invention, which corresponds to a satisfactory matte surface, the thickness of the ethylene-propylene block copolymer layer should be greater than about 0.02 mil. but not be greater than 0.2 mil. If the thickness of the ethylene-propylene block copolymer is less than 0.02 mil, the gloss is greater than 10% and a satisfactory matte surface is not obtained. If the thickness of the ethylene-propylene block copolymer layer is greater than about 0.2 mil., the stiffness or drape of the resulting product becomes unsatisfactory and the gloss is not further lowered to any greater extent. It should be noted that where the other layer or layers employed in the composite film are not pigmented, i.e., are clear, the thickness of the ethylene-propylene block copolymer layer should be greater than about 0.05 mil. to obtain a gloss of less than 10%. However, where the other layer or layers are pigmented, a layer thickness of down to about 0.02 mil is satisfactory to obtain a gloss of less than 10%, and between 0.05 and 0.2 mil. very little additional lowering of gloss is obtained.

The synthetic thermoplastic polymer material forming the other layer or layers of the composite film of the present invention are not critical as long as, at the thickness employed, they give other properties that are satisfactory. For example, the preferred use of the films of the present invention are as the outer moisture proof layer for disposable diapers and as surgical drape material. For these purposes, a good drape or low stiffness is highly desirable. It has been found that in order to obtain such good drape qualities, the stiffness of the overall film should be less than about 30,000 p.s.i. (secant modulus). However, for other uses, a stiffness greater than 30,000 might be satisfactory and thus there is really no limit on the nature of the other synthetic thermoplastic polymer materials employed except that it should be co-extrudable with the ethylene-propylene block copolymer.

Examples of other suitable synthetic thermoplastic polymer materials include low, medium or high density polyethylene, isotactic polypropylene, ethylene-propylene random block or grafted copolymers, ethylene copolymers with vinyl acetate or ethyl acrylate, polyesters such as polyethylene terephthalate, vinylidene copolymers (sarans) and polyamides such as nylon 6 or 66.

The preferred synthetic thermoplastic polymer employed for the other layer or layers or the present invention is low or medium density (i.e., a density of 0.920–0.935 gm./cc.) polyethylene having a melt index (190° C.) of 1.6 to 2.5 gm./10 minutes (determined by ASTM Test D–1238) because of its desirable low stiffness qualities and low cost.

The other thermoplastic polymer layers may be pigmented to impart desirable aesthetic qualities such as by employing a colored or white pigment therein. Desirably, the pigmented layer forms the intermediate layer in a three or more layered composite film construction since in the intermediate layer the pigment will not exude to the surface of the film causing detrimental effects.

A particularly preferred pigmented construction is a three layered film having an overall thickness of from 0.75 to about 2.0 mils. wherein the ethylene-propylene block copolymer outer layer is present in a thickness of about 0.02 to 0.2 mil., an intermediate pigmented layer of low density polyethylene is present in an amount of from about 60% to about 90% by weight of the film, and a third layer of clear low density polyethylene is present as the other outer surface. If enhanced heat sealability is required, one may employ an ethylene-vinyl acetate copolymer as the other outer surface in the preferred construction just described.

The present invention also contemplates the employment of the ethylene-propylene block copolymer on both outer surfaces in a composite film construction of three or more layers to obtain an enhanced matte finished film. Such a construction can be steam sterilized.

In addition to pigmenting one or more of the thermoplastic resin layers, one can employ conventional additives such as slip additives, anti-oxidants, plasticizers and so forth in the various layers. These would be employed in their normal amount.

In producing the matte film of the present invention by the cast film technique, it is immaterial whether the ethylene-propylene block copolymer is in contact with the chill roll or is on the air side during extrusion.

Gloss measursments referred to above and in the examples appearing below are measured in accordance with ASTM Test D–1223.

In the examples below, "MD" means machine direction and "CMD" means cross machine direction.

Example 1

A two layered composite film was extruded by employing an apparatus similar to the one described in British patent 1,16,458. An extruder having a 3½ inch barrel fed molten low density unpigmented polyethylene (Gulf PE 5555) to one passageway of the adapter and a 1¾ inch extruder fed the molten ethylene-propylene block copolymer (Hercules PRO-FAX 8523) to the other passageway. The resins were co-extruded from cast film diehead as a composite film. The thickness of the copolymer layer was varied from 0.01 to about 0.2 mil. The extruded composite film had a caliper (thickness) of between about 1.0 and 1.1. The following table sets forth the gloss of the copolymer layer at various thickness levels:

TABLE 1

| Copolymer thickness (mils.) | Gloss, copolymer side (percent) |
|---|---|
| 0.010 | 44 |
| 0.015 | 36 |
| 0.020 | 30 |
| 0.025 | 27 |
| 0.035 | 14 |
| 0.05 | 10 |
| 0.07 | 8 |
| 0.10 | 6 |
| 0.15 | 5(+) |
| 0.20 | 5 |
| 0.25 | 5(−) |

It is seen from the foregoing table that a gloss of less than 10% is obtained only where the copolymer thickness exceeds about 0.05 mil. and that above about 0.20 mil. the gloss is not further lowered to any significant extent.

Example 2

A three-layered composite film was co-extruded having a construction of 10% ethylene-propylene block copolymer (Hercules PRO-FAX 8523)/85% white pigmented low density polyethylene blend of 20% by weight white pigmented Gulf TD 4341 and 80% by weight Gulf PE 5475C)/5% clear low density polyethylene (Gulf PE 5475C). An apparatus similar to that of British Patent 1,166,458 was employed wherein the adapter had three molten resin passageways. A 3½ inch barrel extruder fed the pigmented low density polyethylene to the center passageway, a 1¾ inch barrel extruder fed the copolymer to one of the outer passageways and a 1¼ inch barrel extruder fed the clear low density polyethylene to the other outer passageway. The resulting trilaminate had the following properties:

TABLE 2

| | |
|---|---|
| Calipher, mils | 1.15 |
| Density, gm./cc. | 0.952 |
| Gloss (copolymer side), percent | 5 |
| Gloss (LDPE side), percent | 47 |
| Opacity, percent | 59 |
| Slip: | |
| (Copolymer to copolymer) | 0.90/0.84 |
| (Copolymer to LDPE) | 0.12/0.12 |
| (LDPE to LDPE) | 0.13/0.13 |
| (Copolymer to stainless steel) | 0.34/0.40 |
| Stiffness, p.s.i. MD | 25,000 |
| (Secant modulus) CMD | 26,000 |
| Tensile Strength, p.s.i.: | |
| MD at 25% elongation | 1370 |
| at break | 3400 |
| CMD at 25% elongation | 1190 |
| at break | 1850 |
| Elongation, percent: | |
| MD | 400 |
| CMD | 820 |
| Impact strength, gms. (26 inches): | |
| $F_{50}$ | 58 |
| No break | 48 |
| Tear strength: | |
| Elmendorf, gms./mil.: | |
| MD | 29 |
| CMD | 216 |
| Graves, lbs.: | |
| MD | 0.47 |
| CMD | 0.67 |

EXAMPLE 3

Example 2 was repeated except that the middle pigmented low density polyethylene layer was a blend of 20% by weight blue pigmented Gulf TD 6975 and 80% by weight clear low density polyethylene (Gulf PE 5555). The trilaminate composite film had the following properties:

TABLE 3

| | |
|---|---|
| Calipher, mils. | 1.15 |
| Density | .930 |
| Gloss, percent: | |
| (Copolymer side) | 4 |
| (LDPE side) | 51 |
| Opacity, percent | 44 |
| Slip: | |
| (Copolymer to copolymer) | .85/.80 |
| (Copolymer to LDPE) | .11/.11 |
| (LDPE/LDPE) | .29/.18 |
| Copolymer/Stainless Steel | .33/.38 |
| Stiffness, p.s.i. MD | 28,000 |
| (Secant Modulus) CMD | 28,000 |
| Tensile Strength, p.s.i.: | |
| MD at 25% Elongation | 1,480 |
| at break | 3,560 |
| CMD at 25% Elongation | 1,370 |
| at break | 2,000 |
| Elongation, percent: | |
| MD | 510 |
| CMD | 870 |
| Impact strength, gms. (26"): | |
| $F_{50}$ | 53 |
| No break | 45 |
| Tear Strength: | |
| Elmendorf, gms./mil | |
| MD | 23 |
| CMD | 302 |
| Graves, lbs.: | |
| MD | .48 |
| CMD | .61 |

EXAMPLE 4

Example 2 was repeated except an theylene-vinyl acetate (EVA) copolymer (Dupont 6526) layer was substituted for the clear low density polyethylene and the final construction was a 2 mil. film having 10% ethylene-propylene block copolymer (Hercules PRO-FAX 8523)/85% blue pigmented low density polyethylene blend/5% EVA. The trilaminate composite film had the following properties:

TABLE 4

| | |
|---|---|
| Calipher, mils. | 2.15 |
| Density | .930 |
| Gloss, percent: | |
| (Copolymer side) | 4 |
| Outside (EVA side) | 46 |
| Opacity, percent | 62 |
| Slip: | |
| (Copolymer to copolymer) | .61/.54 |
| (Copolymer to EVA) | .20/.19 |
| (EVA to EVA) | .19/.16 |
| Copolymer/Stainless Steel | .31/.36 |
| Stiffness, p.s.i. MD | 27,000 |
| (Secant Modulus) CMD | 27,000 |
| Tensile Strength, p.s.i.: | |
| MD at 25% Elongation | 1,300 |
| at break | 2,930 |
| CMD at 25% Elongation | 1,260 |
| at break | 2,030 |
| Elongation, percent: | |
| MD | 860 |
| CMD | 1,060 |
| Impact strength, gms. (26"): | |
| $F_{50}$ | 117 |
| No break | 100 |
| Tear Strength: | |
| Elmendorf, gms./mil | |
| MD | 72 |
| CMD | 290 |
| Graves, lbs.: | |
| MD | 1.18 |
| CMD | 1.17 |

1. A composite film having an overall thickness of between about 0.75 and about 10 mils and comprising two coextruded layers, one layer being an outer layer of a ethylene-propylene block copolymer having an ethylene content of from 3 to about 25% by weight of the copolymer, said outer layer having a thickness between about 0.02 and about mil and a non-embossed matte surface having a surface gloss of less than 10%, the other layer being a layer of one other synthetic thermo-plastic polymer.

2. The film of claim 1 wherein the block copolymer has a nominal melt flow rate at 230° C. of about 3 to about 5 grams/10 minutes.

3. The film of claim 1 wherein the block copolymer has an ethylene content of from about 5 to about 10% by weight of the block copolymer.

4. The film of claim 1 wherein the film has an overall stiffness of less than about 30,000 p.s.i.

5. The film of claim 1 wherein the overall film thickness is between about 0.75 and 2.0 mils.

6. The film of claim 1 wherein the other thermoplastic polymer is selected from the group consisting of polyethylene, polypropylene, ethylene-propylene copoylmers, ethylene-vinylacetate copolymers, ethylene-ethylacrylate copolymers, polyester, vinylidene copolymers, and polyamides.

7. The film of claim 1 wherein the other thermoplastic polymer is polyethylene.

8. The film of claim 1 wherein the other thermoplastic polymer is polyethylene having a density of from about 0.920 to about 0.935 gm./cc. and a melt index at 190° C. of from about 1.6 to about 2.5 grams/10 minutes.

9. The film of claim 1 including a third coextruded layer of one other synthetic thermoplastic polymer.

10. The film of claim 9 wherein the third layer is an outer layer of an ethylene-vinylacetate copolymer.

11. The film of claim 10 wherein the intermediate layer is polyethylene.

References Cited

UNITED STATES PATENTS

| | | | |
|---|---|---|---|
| 2,810,232 | 10/1957 | Fletcher | 161—164 X |
| 2,565,491 | 8/1951 | Francis | 161—164 X |
| 3,154,461 | 10/1964 | Johnson | 161—164 X |
| 3,484,835 | 12/1969 | Trounstine et al. | 161—164 X |
| 3,544,671 | 12/1970 | Sandford et al. | 260—878 B |
| 3,533,731 | 10/1970 | Schmidl et al. | 260—878 B |

GEORGE F. LESMES, Primary Examiner

P. C. IVES, Assistant Examiner

U.S. Cl. X.R.

128—290 W, 82; 161—116, 165, 411, 227, 231, 252; 260—878 B